United States Patent [19]
Hurd
[11] 3,742,381
[45] June 26, 1973

[54] WIDEBAND DIGITAL PSEUDO-GAUSSIAN NOISE GENERATOR

[75] Inventor: William J. Hurd, La Canada, Calif.
[73] Assignee: California Institute of Technology, Pasadena, Calif.

[22] Filed: June 9, 1971
[21] Appl. No.: 151,305

[52] U.S. Cl. .......... 331/78, 328/63, 328/37, 307/216
[51] Int. Cl. .......... H03b 29/00
[58] Field of Search .......... 328/63, 37; 331/78; 307/216

[56] References Cited

UNITED STATES PATENTS 3,439,279 4/1969 Guanella .......... 328/63
3,521,185 7/1970 Ley .......... 331/78
3,624,610 11/1971 Warring .......... 331/78 X

OTHER PUBLICATIONS

Electronic Engr. July 1965 pp.–465–467 "A Low—Freq. Pseudo–Random Noise Gen." by Kramer.

IBM Vol. 8 No. 9 February 1966, "Noise Generated by Digital Technique" by Buron et al.

*Primary Examiner*—John S. Heyman
*Attorney*—Lindenberg, Freilich & Wasserman

[57] ABSTRACT

A wideband digital pseudo-gaussian noise generator is disclosed. It includes two feedback shift registers which provide maximal length pseudo noise sequences. Selected stages of the two registers are fed as inputs to 30 exclusive-OR gates, the stages being selected so that their outputs represent distinct phase shifts of a product sequence. The outputs of the gates are summed to provide the generator's output which approximates gaussian noise over a useful bandwidth of 10MHz.

13 Claims, 3 Drawing Figures

INVENTOR.
WILLIAM J. HURD
BY
Lindenberg, Freilich & Wasserman
ATTORNEYS

| EXCLUSIVE-OR UNIT | REG. X STAGE | REG. Y STAGE |
|---|---|---|
| G1 | 0 | 21 |
| G2 | 1 | 20 |
| G3 | 2 | 19 |
| G4 | 3 | 18 |
| G5 | 4 | 17 |
| G6 | 5 | 16 |
| G7 | 6 | 15 |
| G8 | 7 | 14 |
| G9 | 8 | 13 |
| G10 | 9 | 12 |
| G11 | 10 | 11 |
| G12 | 11 | 10 |
| G13 | 12 | 9 |
| G14 | 13 | 8 |
| G15 | 14 | 7 |
| G16 | 15 | 6 |
| G17 | 16 | 5 |
| G18 | 17 | 4 |
| G19 | 18 | 3 |
| G20 | 19 | 2 |
| G21 | 20 | 1 |
| G22 | 21 | 0 |
| G23 | 23 | 4 |
| G24 | 28 | 1 |
| G25 | 30 | 7 |
| G26 | 31 | 6 |
| G27 | 35 | 2 |
| G28 | 36 | 5 |
| G29 | 37 | 0 |
| G30 | 38 | 3 |

FIG. 2

WILLIAM J. HURD
*INVENTOR.*

*BY*
Lindenberg Freilich & Wasserman
ATTORNEYS

WIDEBAND DIGITAL PSEUDO-GAUSSIAN NOISE GENERATOR

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention generally relates to noise generators and, more particularly, to a wideband digital pseudo-gaussian noise generator.

2. Description of the Prior Art

Wideband video gaussian noise is required to test communication systems and in the simulation of many other types of systems. The required noise bandwidths may range from zero or close to zero Hertz to several Megahertz. Commercially available analog noise generators, using noise tube or diode sources, are often not satisfactory for several possible reasons: the bandwidth may not be wide enough, the spectral density may not be flat enough in the passband, the probability distribution may not be close enough to gaussian, and the stability of the noise parameters may not be good enough. The amplitude distribution is often so skewed that the sample waveform is visibly asymmetric when viewed on an oscilloscope, and the spectral density is typically specified as flat to within only ±1 dB or ±3 dB. Noise with these characteristics is clearly not acceptable in testing a communication system whose performance must be known to within one of two tenths of a decibel.

Recently a noise generator has become available which employs digital logic. One of the basic limitations of this prior art generator is its limited bandwidth. Therein the noise becomes close enough to gaussian only if the clock rate is hundreds of times higher than the generator3 s bandwidth. Thus even with a relatively high clock rate, e.g., 35 MHz, the bandwidth is only about 100kHz, which is not adequate for many applications.

OBJECTS AND SUMMARY OF THE INVENTION

It is a primary object of the present invention to provide a new pseudo-gaussian noise generator.

Another object is to provide a new digital pseudo-gaussian noise generator.

A further object of the present invention is to provide a new, reliable, relatively inexpensive digital pseudo-gaussian noise generator with a bandwidth of at least several Megahertz (MHz), with a spectral density which is flat to less than 1 decibel (dB).

Still a further object of the present invention is to provide a new, reliable digital pseudo-gaussian noise generator with a bandwidth which is greater than at least one-tenth the clock rate.

These and other objects of the invention are achieved by providing a digital pseudo-gaussian noise generator, hereafter simply referred to as the noise generator, which includes a pair of feedback shift registers, designated X and Y. The two registers which provide two maximal length linear pseudo-noise (PN) sequences have relatively prime lengths N and M, respectively. The outputs of selected stages of each of the two registers are combined by means of a plurality of units. Each unit provides an output which is the exclusive-OR function of the outputs of two stages, each from a different one of the two registers which are supplied thereto. The outputs of these units are summed and the sum applied to an operational amplifier whose output, after filtering out the frequency at which the registers are clocked, represents the generator's output. The outputs of the plurality of exclusive-OR -OR units are different phase shifts of one long pseudo-noise sequence whose length is the product of the lengths of the two maximal length sequences generated by the X and Y registers. The various stages of the registers, connected to the plurality of the exclusive-OR units, are chosen so that the outputs of the units are approximately equally spaced phase shifts of the long product sequence.

The novel features of the invention are set forth with particularity in the appended claims. The invention will best be understood from the following description when read in conjunction with the accompanying drawings.

BRIEF DESCRIPTION OF THE DRAWINGS

FIG. 2 is a chart listing the connections between stages of two registers and exclusive-OR units shown in FIG. 1.

DESCRIPTION OF THE PREFERRED EMBODIMENTS

Figure 1:
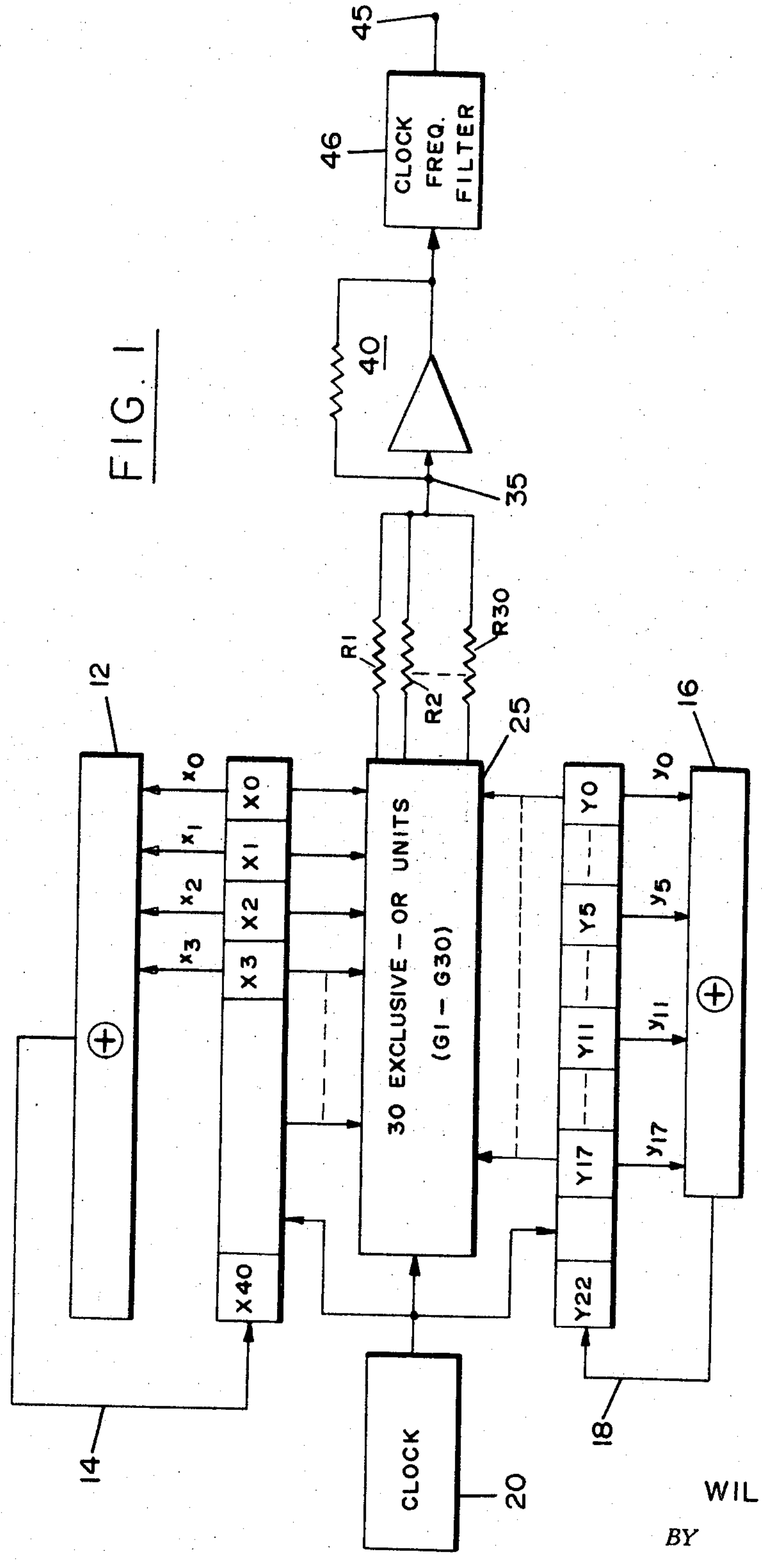
FIG. 1 is a complete block diagram of a specific embodiment of the novel noise generator of the present invention.

The teachings of the invention may best be explained by first describing a specific embodiment which was reduced to practice. Thereafter the general principles of operation of the invention will be presented, followed by a summary of the principles which should be considered in implementing other embodiments in accordance with the present invention. In the specific embodiment, diagrammed in FIG. 1, the noise generator comprises two registers designated X and Y. Register X consists of 41 stages designated X40 through X0, with stage X40 representing the input stage, and register Y consists of 23 stages designated Y22 through Y0, with stage Y22 representing the input stage. The outputs of stages X0–X40 are designated $x_0$–$x_{40}$ and the outputs of stages Y0–Y40 are designated $y_0$–$y_{40}$.

The outputs $x_0$–$x_3$ are supplied to a modulo-2 unit 12 whose output which is the exclusive-OR function of $x_0$–$x_3$ is supplied on line 14 to input stage X40. Another modulo-2 unit 16 receives the outputs $y_0$, $y_5$, $y_{11}$ and $y_{17}$ and supplies an input on line 18 to input stage Y22. Each of the stages is in either of two states, often referred to as a 1 or 0 state. The two registers are assumed to be clocked by clock pulses from a clock 20. In the particular embodiment the clock rate is 35MHz. As is appreciated by those familiar with the art, each of these registers when clocked is capable of providing a maximal length linear PN sequence. The period of the sequence of register X is $2^{41}-1$, while that of register Y is $2^{23}-1$.

The noise generator further includes 30 exclusive-OR units represented by block 25, and hereafter designated G1–G30. Each of these units receives two inputs. One input is from a stage of register X and the other from a stage of register Y. The unit provides an output which is the exclusive-OR function of the outputs or states of the two stages which are connected thereto. The stages which are connected to units G1–G30 are listed in FIG. 2.

Therefrom it is thus seen that unit G1 is supplied with the outputs $x_0$ and $y_{21}$ of stages X0 and Y21, respectively. Unit G1 is diagrammed in FIG. 3. Each of the other units (G2–G30) is similarly supplied with an output from one stage of register X and another output from one stage of register Y. As seen from FIG. 2, each of 30 of the 41 stages of register X is used only once. However, since 30 units are employed and since register Y comprises only 23 stages, several of its stages were used more than once.

Figure 3:
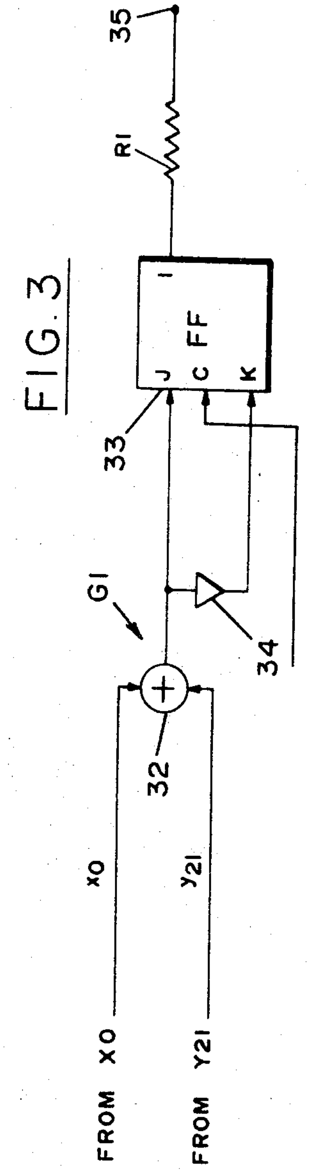
FIG. 3 is a diagram of a typical exclusive-OR unit.

As shown in FIG. 3, unit G1 comprises an exclusive-OR gate 32 whose output is supplied directly to the J input of a flip-flop (FF) 33 and through an inverter 34 to the K input. FF33 is closed by the clock pulses from clock 20. The 1 output of FF33 is shown connected through a resistor R1 to a summing point 35 at the input to an operational amplifier 40 (see FIG. 1). Similarly, the 1 outputs of FFs 33 of the units G2–G30 are connected at point 35 through resistors R2–R30, respectively.

As the registers X and Y and units G1–G30 are clocked, the potential during each clock period at point 35 depends on the states of the thirty FFs 33 which are in turn dependent on the states of the various stages of the two shift registers which are connected to units G1–G30. The output of amplifier 40 represents the output of the noise generator. Preferably the amplifier output is connected to a noise generator output terminal 45 through a filter 46, which filters out the clock frequency, e.g., 35MHz.

An analysis of the power spectrum of the output of the noise generator when clocked at 35MHz was found to be flat to ±0.5dB from 0 to 10MHz. Such a bandwidth is not attainable with any of the prior art noise generators. For example, in a prior art digital noise generator, the spectrum is flat to ±3dB over a bandwidth which is one-twentieth of the clock and is flat to less than ±0.3dB over a bandwidth which is one-fortieth of the clock rate. Thus the present invention provides an increase in bandwidth by a factor of 10 over the prior art for the same clock rate. The theoretical power spectral density of the noise generator at terminal 35 is $$[\sin(\pi f/f_c)/(\pi f/f_c)]^2$$

where $f$ is frequency and $f_c$ is the clock frequency 35MHz. At terminal 35 at 10MHz, the theoretical power spectral density is down by 1.2dB. However, by choosing an amplifier 40 with a rising frequency response at the upper bandwidth limit, the observed spectral density was flat to within ±0.5dB over the entire 0 to 10MHz band.

The operation of the specific noise generator herebefore described will now be analyzed in general terms, assuming that one generates two maximal length linear shift register (PN) sequences in shift registers X and Y of relatively prime lengths N and M, respectively. The sequences at the various shift register stages can be labeled $X_i(k)$ and $Y_j(k)$, where the subscripts $i=0,1,\ldots,N-1$ and $j=0,1,\ldots,M-1$ denote the register stages, the argument K denotes time, and the binary values are taken to be +1 and −1. The shifting is assumed to be from higher to lower numbered stages, so $$X_i(k+1) = X_{i+1}(k),\ k=0,1,\ldots,N-2$$
$$Y_j(k+1) = Y_{j+1}(k),\ k=0,1,\ldots,M-2$$

and $X_{N-1}(k+1)$ and $Y_{M-1}(k+1)$ are linear functions of the values in the respective registers at time $k$.

One can form sequences $Z_{ij}(k)=X_i(k)Y_j(k)$ by multiplying the outputs of $X_i(k)$ and $Y_j(k)$. The periods of the $X$, $Y$, and $Z$ sequences are $p_x=2^N-1$, $p_y=2^M-1$ and $p_z=p_xp_y=2^{N+M}-2^N-2^M+1$. For reasonably large $N$ and $M$, $p_z$ is almost equal to the maximum length of a linear sequence generated by a shift register of $N+M$ stages.

The correlation properties of $Z$ are similar to those of $X$ and $Y$, so that $Z$ is approximately a white noise sequence. The normalized in-phase correlations of $X$ and $Y$ are 1, and the out of phase correlations are $-1/p_x$ and $-1/p_y$, respectively. For $Z$, the in-phase correlation is 1, and the out of phase correlation is $+1/p_z$, except for phase shifts $np_x$ and $np_y$ (mod $p_z$), at which points it is $-1/p_y$ and $-1/p_x$, respectively. For reasonable large $p_x$ and $p_y$, all of the out of phase correlations are small, as desired for "white" noise.

The phase relationships between the $Z_{ij}(k)$ can be determined by the phase of each with respect to a reference phase, which we choose to be $Z_{oo}(k)$. Denoting the delay from $Z_{ij}$ to $Z_{oo}$ by $t_{ij}$, $Z_{ij}(k)=Z_{oo}(k+t_{ij})$ for all $k$. This requires that $X_i(k)=X_o(k+t_{ij})$ and $Y_j(k)=Y_o(k+t_{ij})$, both for all $k$. Since $X_i(k)=X_o(k+i+np_x)$ for all $n$ and $k$, and $Y_j(k)=Y_o(k+j+mp_y)$ for all $m$ and $k$, $$t_{ij} \equiv i \pmod{p_x}$$
$$\equiv j \pmod{p_y}.$$

Now, since $p_x$ and $p_y$ are relatively prime, one can use the Euclidean algorithm to find $a_x$ and $a_y$ such that $$a_xP_x+a_yp_y=1.$$

Finally, $$t_{ij} \equiv i\,a_xp_x + ja_yp_y \pmod{p_xp_y}$$

since this expression reduces to $i$ (mod $p_x$) and to $j$ (mod $p_y$).

For the noise generator herebefore described, N and M were chosen to be 41 and 23, respectively. For this case, $$a_x = 2^{21}+2^{18}+2^{16}+2^{13}+2^{11}+2^8+2^6+2^3+2^0$$

and $$a_xp_x = 1-a_yp_y = a_x(2^{41}-1).$$

Expressed as binary fractions, $$a_xp_x/p_z \approx 0.0100101001\ldots$$

which is approximately a repeating fraction equal to 9/31. Thus $$t_{ij} \approx (9/31)(i-j)\ p_z,$$

with the approximation being valid for small enough $i$ and $j$ that the repeating fraction approximation is good. It is thus seen that by carefully selecting pairs $i$ and $j$, one can obtain 31 shifts of $Z_{ij}$ which are approximately equally spaced modulo $p_z$.

In the actual implementation herebefore described, thirty such shifts were used. These shifts could have been chosen by fixing $j$ and choosing 30 consecutive taps of $X$. This has the disadvantage, however, that although the $Z_{ij}$ thus obtained would be uncorrelated, adjacent sums of the 30 $Z_{ij}$ are highly dependent, since 29 of the 30 terms in adjacent sums would be the same, except possibly for the sign. This is seen by expanding the sums and comparing, for example, $$\sum_{i=0}^{29} X_0(k)Y_i(k) = X_0(k)\left[X_0(k) + \sum_{i=1}^{29} Y_i(k)\right]$$

and $$\sum_{i=0}^{29} X_0(k+1)Y_i(k+1) = X_0(k+1)\sum_{i=0}^{29} Y_{i+1}(k)$$

$$= X_0(k+1)\left[Y_{31}(k) + \sum_{i=1}^{29} Y_i(k)\right]$$

These two sums differ only by $Y_0(k)-Y_{31}(k)$ when $X_0(k)=X_0(k+1)$, and are similarly related by opposite sign when $X_0(k)=-X_0(k+1)$. For this reason, care was taken to use different $X_i$ for each Z, and to use no $Y_j$ more than twice. Some duplication of $Y_j$'s was necessary because M was equal to 23 and 30 shifts were desired. The actual $Z_{ij}$ selected correspond to $(i,j)=(n,21-n)$, $n=0,1,\ldots,21$, and $(i,j)=(30,7)$, (31,6), (28,1), (23,4), (36,5), (35,2, (38,3), and (37,0), as shown in FIG. 2.

That these values of $i$ and $j$ provide 30 shifts which are approximately equally spaced modulo $p_z$ can be seen by substituting these values of $i$ and $j$ in the expression $$t_{ij}/p_z \approx (9/31)\,(i-j),$$

and noticing that the remainders are distributed between 0 and 30. For example, when $i=21$ and $j=0$, the remainder is $(9/31)(21-0)=(189/31)=6$ remainder 3, while the remainder is 16 when i=20 and j=1, [(9/31) (20−1) = 5 remainder 16]. With a system clock rate of 35 MHz, Z repeats approximately every 17,000 years, and each pair of $Z_{ij}$'s is separated by over 500 years.

The shift register sequences of registers X and Y are defined by the primitive polynomials $$x^{41}+x^3+x^2+x+1=0$$

and $$y^{23}+y^{17}+y^{11}+y^5+1=0\ .$$

It is thus seen that in the specific embodiment each of the 30 shifts of the product sequence of a length approximately $2^{64}$ does not overlap any other shift over a length of approximately $2^{59}$. Thus the shifts can be viewed as representing 30 distinct sequences, each of a length of approximately $2^{59}$. This is achieved with only 64 stages of shift registers, compared with 30×59=1,770 stages if 30 separate shift registers were used to generate 30 distinct sequences.

Although a specific embodiment has been described, from the foregoing analysis it is appreciated that different arrangements may be employed in practicing the teachings of the invention. For example, more or less than thirty shifts may be used. The number of shifts which are summed at the input of the amplifier and the ratio of the clock frequency to the desired bandwidth actually control how close to the output noise is to Gaussian noise. Let, (clock frequency/desired bandwidth) · (Number of shifts summed) = F.

It has been found that the output noise is very close to Gaussian noise out to $$\sqrt[4]{f}\cdot \text{RMS noise voltage (or standard deviation).}$$

It is thus seen that the same approximation to Gaussian noise may be obtained with fewer shifts if a reduction in desired bandwidth is tolerable. In the specific embodiment with a clock frequency of 35MHz, a desired bandwidth of 10MHZ and 30 shifts $F$ is approximately equal to 100. Thus the noise is very close to gaussian out to $$\sqrt[4]{100}\cdot\sigma = 3.16\sigma,$$

where $\sigma$ represents the standard deviation or RMS noise voltage.

In the above example the clock frequency (35MHz) is about 3.5 times the desired noise bandwidth (10MHz). In general the clock frequency should be greater than 2 to 4 times the desired noise bandwidth, to reduce the effect of periodicities at the clock frequency. As previously pointed out $N$ and $M$, i.e., the lengths of registers $X$ and $Y$ should preferably by relatively prime, so that the product sequence has as long a period as possible. Also each of $N$ and $M$ should preferably be fairly large so that $$(2^N-1)(2^M-1)\approx 2^{N+M}.$$

It is desirable, but not necessary, that the sequences generated by $X$ and $Y$ be maximal length. Thus $N$ and $M$ should be chosen to enable easy implementation of maximal length PN sequences, produced by feeding back the outputs of a plurality of stages, e.g., four of each register. The desired length of the product sequence depends on the maximal length of the experiments which will use the noise generator. None of the many, e.g., 30, shifts should overlap within the experiment period. Good results for relatively long experiments are achievable when $$2^{N+M}/(\text{number of clock pulses per year}) > 1\ .$$

Finally, $N$ and $M$ should be chosen so that one can obtain a sufficient number of widely separated shifts of the product sequence. As previously indicated this is determined by solving $$a_x p_x + a_y p_y = 1,$$

using Euclidean algorithm. $N+M$ should be increased above the minimum according to the criteria of experiment duration in order to find $N$ and $M$ to satisfy the criteria of widely separated shifts.

Although herebefore the invention was described in connection with an embodiment using two shift registers, each providing a maximal length PN sequence, the advantages of the invention may be realized using more than two registers. Also the registers do not necessarily have to provide maximal length PN sequences. In such an embodiment the exclusive-OR units would preferably but not necessarily take one input from each register and the outputs of the units would be summed as herebefore described. It should be apparent that if some of the exclusive-OR units do not take one input from each register, the outputs from all the units may not be from the same sequence and therefore the analysis of the noise characteristics would be more difficult. Also the lengths of the product sequence will not be the same. However, pseudo noise with characteristics adequate for many experiments will be produced.

Summarizing the foregoing description in accordance with the present invention, a novel wideband digital pseudo-gaussian noise generator is provided. It includes at least two relatively long shift registers of lengths which are preferably relatively prime. Several stages of each register are modulo-2 added in a feedback unit whose output is fed back to the register to provide a pseudo noise sequence, preferably of maximal length. Selected stages of each of the registers are connected to plurality of exclusive-OR gates to provide a plurality of output product sequences or shifts of one or more product sequences. The shifts are preferably approximately equally spaced about the product sequences. The outputs of the exclusive-OR gates are summed to feed and operational amplifier whose output effectively represents the generator's output. The amplifier's output may be filtered by a filter designed to attenuate signals at the frequency at which the shift registers are clocked.

Although a specific embodiment of the invention has been described, it is appreciated that various modifications or equivalents may be used without departing from the spirit of the invention. For example, the summation accomplished by the operational amplifier may be accomplished by any appropriate analog or digital network with or without amplification. Therefore, all such modifications and/or equivalents are deemed to fall within the scope of the invention as defined in the appended claims.

What is claimed is:

1. A pseudo-gaussian noise generator, comprising:

*n* multistage feedback shift registers providing independent pseudo noise sequences;

clock means for clocking said shift registers at a preselected frequency;

means including *m* exclusive-OR gates, and means for coupling each gate to one selected stage of one of said registers and to one selected stage of another of said registers, *n* and *m* being integers greater than one and *m* is greater than *n*, with the output of substantially each gate being a pseudo noise sequence of a length significantly longer than the sequence of any of said n registers and which is substantially independent on the sequences of the other gates; and output means for providing a pseudo-gaussian noise output which is a function of the outputs of said exclusive-OR gates.

2. The arrangement as recited in claim 1 wherein at least one of said shift registers is of relatively prime length.

3. The arrangement as recited in claim 1 wherein at least one of said shift registers provides a maximal length pseudo noise sequence.

4. The arrangement as recited in claim 1 wherein each of said exclusive-OR gates is coupled to one stage of each of said plurality of shift registers.

5. A pseudo-gaussian noise generator comprising:

first and second feedback shift registers providing independent pseudo noise sequences, and having numbers of stages definable as *N* and *M*, respectively;

clock means for clocking said shift registers at a preselected frequency;

means including a plurality of exclusive-OR gates, and means for coupling each gate to one selected stage of said first register and to one selected stage of said second register, with the output of each gate being a pseudo noise sequence which is substantially longer than the sequence of either of said registers and is substantially independent of the sequences of the other gates; and output means for providing a pseudo-gaussian noise output which is a function of the outputs of said exclusive-OR gates.

6. The arrangement as recited in claim 5 wherein the length of at least one of said first and second registers is relatively prime and the number of gates definable as *K* is significantly greater than two and is not less than the smaller of either *N* or *M*.

7. The arrangement as recited in claim 5 wherein said means for coupling couple said gates to said registers so that the pseudo-gaussian noise output is flat to within less than 1 decibel over a desired bandwidth, and the number of said exclusive-OR gates is related to the frequency of said clock means, the desired bandwidth and the desired proximity of said pseudo-gaussian noise output to gaussian noise.

8. A pseudo-gaussian noise generator, comprising:

first and second feedback shift registers providing pseudo noise sequences, and having numbers of stages definable as *N* and *M*, respectively;

clock means for clocking said shift registers at a preselected frequency;

a plurality of exclusive-OR gates, substantially each coupled to one selected stage of said first register and to one selected stage of said second register; and output means for providing a pseudo-gaussian noise output which is a function of the outputs of said exclusive-OR gates, wherein *N* and *M* are relatively prime and each of *N* and *M* is relatively long so that $$(2^N-1)(2^M-1)\approx 2^{N+M}.$$

9. The arrangement as recited in claim 7 wherein the pseudo-gaussian noise output is substantially flat to less than 1 decibel over a noise bandwidth which is not less than one-tenth the frequency at which said registers are clocked by said clock means.

10. The arrangement as recited in claim 9 wherein the frequency of said clock means is at least 10 megahertz (MHz) and the bandwidth of said noise output is at least 1 megahertz.

11. The arrangement as recited in claim 10 wherein the number of said exclusive-OR gates is at least ten, the frequency of said clock means is several tens of megahertz and the pseudo-gaussian noise output bandwidth is greater than 1 megahertz.

12. The arrangement as recited in claim 11 wherein the number of said exclusive-OR gates is 30.

13. A pseudo-gaussian noise generator, comprising:

first and second feedback shift registers providing pseudo noise sequences, and having numbers of stages definable of *N* and *M*, respectively;

clock means for clocking said shift registers at a preselected frequency;

a plurality of exclusive-OR gates, substantially each coupled to one selected stage of said first register and to one selected stage of said second register; and output means for providing a pseudo-gaussian noise output which is a function of the outputs of said exclusive-OR gates, wherein $N$=41 and $M$=23, said first register providing a pseudo noise sequence of a length $2^{41}-1$ and said second register providing a pseudo noise sequence of a length $2^{23}-1$, and each of exclusive-OR gates provides a shift of a product sequence of a length that is substantially equal to $2^{(41+23)}$.

* * * * *